United States Patent [19]
Randle et al.

[11] Patent Number: 5,774,663
[45] Date of Patent: Jun. 30, 1998

[54] PERSONAL BANKER CUSTOMER MANAGEMENT SYSTEM PROVIDING INTERACTIVE VIDEO COMMUNICATION IN REAL TIME CONCERNING BANKING INFORMATION

[75] Inventors: William M. Randle, Bexley; John Voss, Dublin, both of Ohio

[73] Assignee: Huntington Bancshares, Inc., Columbus, Ohio

[21] Appl. No.: 523,692

[22] Filed: Sep. 5, 1995

[51] Int. Cl.[6] .................................................. E04H 1/12
[52] U.S. Cl. ...................................... 395/200.34; 902/39
[58] Field of Search ........................ 364/514 A, 709.04; 235/379; 902/6, 8, 10, 22, 35, 39; 379/74, 158; 395/242, 227, 235, 239, 243, 200.34, 200.47

[56] References Cited

U.S. PATENT DOCUMENTS

| | | | |
|---|---|---|---|
| 4,321,672 | 3/1982 | Braun et al. | 395/242 |
| 4,845,636 | 7/1989 | Walker | 364/479.07 |
| 5,221,838 | 6/1993 | Gutman et al. | 235/379 |
| 5,265,033 | 11/1993 | Vajk et al. | 364/514 C |
| 5,375,068 | 12/1994 | Palmer et al. | 364/514 C |

Primary Examiner—James P. Trammell
Assistant Examiner—Thomas Peeso
Attorney, Agent, or Firm—Porter, Wright, Morris & Arthur

[57] ABSTRACT

A system and process for providing financial services via video in real time to a customer at one of a plurality of remote locations from one of a plurality of personal bankers at a central location via a video self-service device.

15 Claims, 5 Drawing Sheets

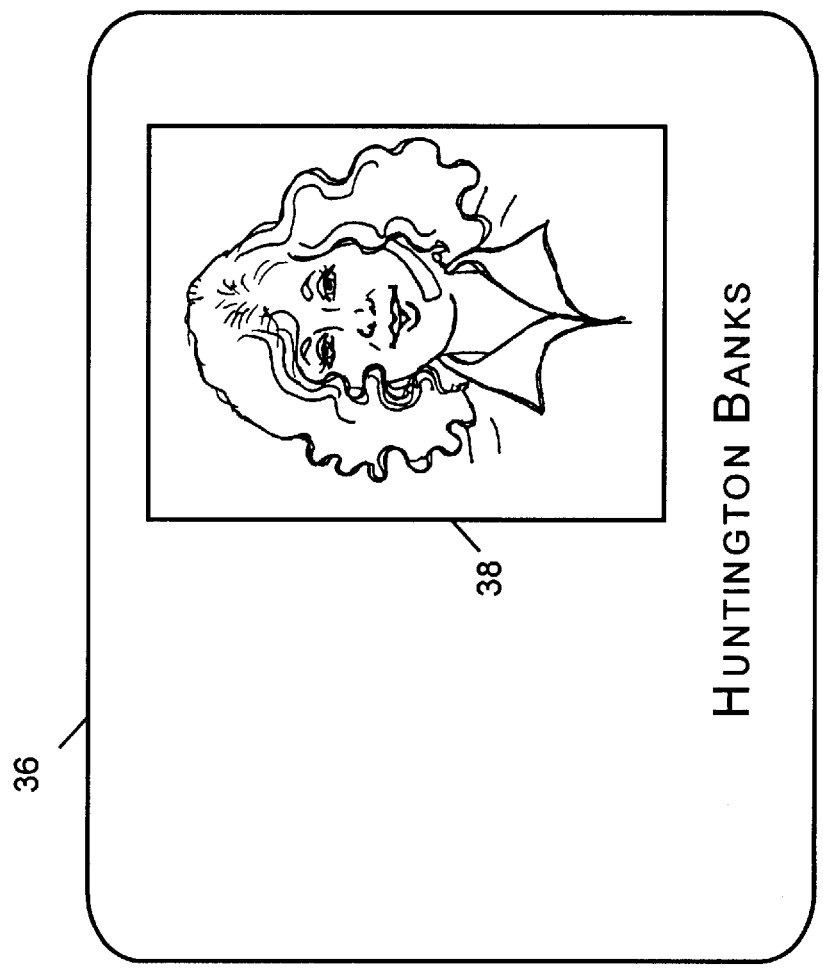

PERSONAL BANKER CUSTOMER MANAGEMENT SYSTEM PROVIDING INTERACTIVE VIDEO COMMUNICATION IN REAL TIME CONCERNING BANKING INFORMATION

FIELD OF THE INVENTION

This invention relates to a system and process for providing personal financial services in real time from one of a plurality of personal bankers at a central location to a customer at one of a plurality of locations remote from the bankers via a video interface between a consumer and a banker and for efficiently managing banker utilization for customer service purposes.

BACKGROUND AND SUMMARY OF THE INVENTION

An increasing number of people are demanding more convenience to access various types of financial services. Catering to the demand for added convenience in financial services are ATMs, direct deposit, and banking by telephone and mail. Financial services were originally provided to customers on a one-to-one basis by bankers located in banks. Bankers met face-to-face with a customer who desired to obtain financial services or information regarding financial services. The banker and the customer normally met at the bank to discuss various financial services offered by the bank and other information and products offered by the bank that would meet the customer's financial needs. The banker would explain the details of these financial services and respond to any of the customer's questions or requests for information. In this context, the banker-customer relationship was live, personal and interactive and the customer could obtain financial services, products and information through human interaction.

The face-to-face meeting between the banker and the customer was flexible because the banker could explain the various financial services available to the customer in varying detail based on the customer's knowledge or interest in learning a little or a lot about a particular financial service or product. The banker could provide immediate responses to any questions that the customer had about any of the financial services, products or other information that the bank provides. This human interaction between the banker and the customer developed a bond and trust between them.

The face-to-face relationships between the banker and the customer, however, have economic costs: the labor cost is high; if a branch office of the bank is not busy, the banker may spend idle time waiting for customers. Also, to provide full service, each branch office of the bank must have a person knowledgeable in all aspects of the financial services and products that the bank provides. This is inefficient and not cost effective.

Due in part to the highly competitive nature of the banking industry, banks have attempted to reduce costs and increase services. Banks have tried to automate banking with ATMs and by providing banking from home via voice telephony or personal computer access. The expanded use of ATMs, which are "self-service" machines, has helped to reduce labor costs involved with the provision of a limited range of services, typically withdrawals and deposits and account balance inquiry. These self-service machines also enable a customer to have access to some basic financial information 24 hours a day. The self-service machines are limited in their capability and have a disadvantage in that they eliminate personal human interaction between a banking professional and the customer.

The banking industry was built on the development of institutional trust between the customer and the institution, and the lack of human interaction weakens ties between the banker and the customers. Many customers still prefer face-to-face interaction with their banker rather than through a self-service machine, a computer or a telephone. Voice telephony to a bank from home does make communications between the banker and the customer more personal, but it still does not have all of the benefits of a face-to-face meeting between the banker and the customer. Networks of self-service machines and the use of voice telephony for banking from home provide the economic benefit that financial services information can be stored in a central computer, rather than stored at a variety of bank branch locations. The human interaction between the banker and the customer becomes more important as the types of financial services increase, both in number and complexity. There is thus a need for personal, human interaction to continue while still enabling the cost effective and convenient provision of financial services to the customer.

The present invention provides a system and method for efficiently providing automated financial services while maintaining the personal, human interaction between the banker and the customer. The present invention allows the customer to receive personal banking services in real time at a remote location with the ability to have a face-to-face conversation with a banker who is knowledgeable about the bank's financial services, products and information and who can immediately respond to customer needs. This is also an advantage to the bank because knowledgeable bankers can be located in a centralized or regionalized location serving customers from different locations in queue rather than having individual bankers located at offices waiting for customers to come to the office. The banker's "down time" waiting for customers is reduced and fewer bankers are required to service the customers. This is also an advantage for the times during the day and night when the bank offices are closed; with the system of the invention, efficient use of bank personnel will allow the customer access to a knowledgeable banker at all times on a face-to-face basis.

The present invention includes a method for providing banking services via video in real time to a customer at one of a plurality of remote locations from among a plurality of bankers at other locations. This method includes providing at least one customer kiosk at a remote location with the kiosk having a video camera, a video screen, means for receiving customer input, and means by which a customer can register a request for video connection to a banker. The method includes connecting the customer kiosk to a central information processor for data communication therebetween and the central information processor that contains information and data files regarding the customer's account and the bank services, and products. The method further includes connecting the central information processor to a terminal of an available banker from a plurality of bankers for data communication therebetween upon receipt of the customer's request for video connection to a banker. The banker's terminal has a windowed video screen that can display the video of the customer at the kiosk. The method also includes connecting the available banker by video to the customer kiosk to enable a real time video conference between the banker and the customer. During this video conference, the banker and the customer can have a conversation about the customer's needs. This electronically replicates the traditional in-person face-to-face conference between the banker and the customer at a bank office.

The method of the present invention also includes the step of connecting the central information processor to an available banker using a call distributor that will search for an available banker from a plurality of bankers. If there are no available bankers, the call distributor puts the customer's request for connection to a banker into a queue and connects the customer to a banker via video when a banker becomes available. If a predetermined period of time passes before a banker becomes available, the call distributor will place a voice call to an available banker with voice access. The method of the present invention also enables the printing of information about the bank's services and products, and the printing of documents such as contracts and loan applications.

The present invention also includes a system for providing banking services via video and real time to a customer at one of plurality of remote locations from among a plurality of bankers at a central location or other locations. The system includes at least one customer kiosk at a remote location. The kiosk has a video camera and video screen, means for receiving customer input, and means by which a customer can register a request for video connection to a banker. A first communications link is provided that connects the customer kiosk to a central information processor containing information and data files regarding the customer's account and the bank's services, products and information. A second communications link is provided that connects the central information processor to a banker's terminal. A video communications link is also provided that connects the banker's terminal to the customer kiosk and vice versa. A call distributor connects the customer to the banker by video by way of a sequence of direct connection to an available banker, hold and queue for attention by a next available banker, call transfer and identification of the kiosk from which the customer's request for video connection to a banker was initiated. The system is used such that when the banker's terminal receives the customer's request for video connection to a banker, the banker's terminal effects a video connection over the video communications link between the banker's terminal and the customer kiosk to enable a real time video conference between the customer and the banker.

The video screen of the customer kiosk displays a video image of the banker on a portion or all of the video screen during the real time video conference between the customer and the banker. On other portions of the video screen of the customer kiosk that do not show the video of the banker, information and data can be displayed regarding the customer's account and bank services, products and information during the real time video conference between the customer and the banker.

The video screen of the banker's terminal will be similar to the video screen of the customer kiosk in that a video of the customer, bank documents and the like, may be displayed on a portion or all of the video screen during the video conference between the customer and the banker. The video screen on the banker's terminal may likewise display information and data on portions of the video screen that are not being used to display a video of the customer during the video conference between the customer and the banker.

BRIEF DESCRIPTION OF THE DRAWINGS

FIG. 3C shows a display screen at the customer kiosk with a video of a banker shown on a portion of the display screen.

DETAILED DESCRIPTION OF THE INVENTION AND THE PREFERRED EMBODIMENT(S)

Figure 1:
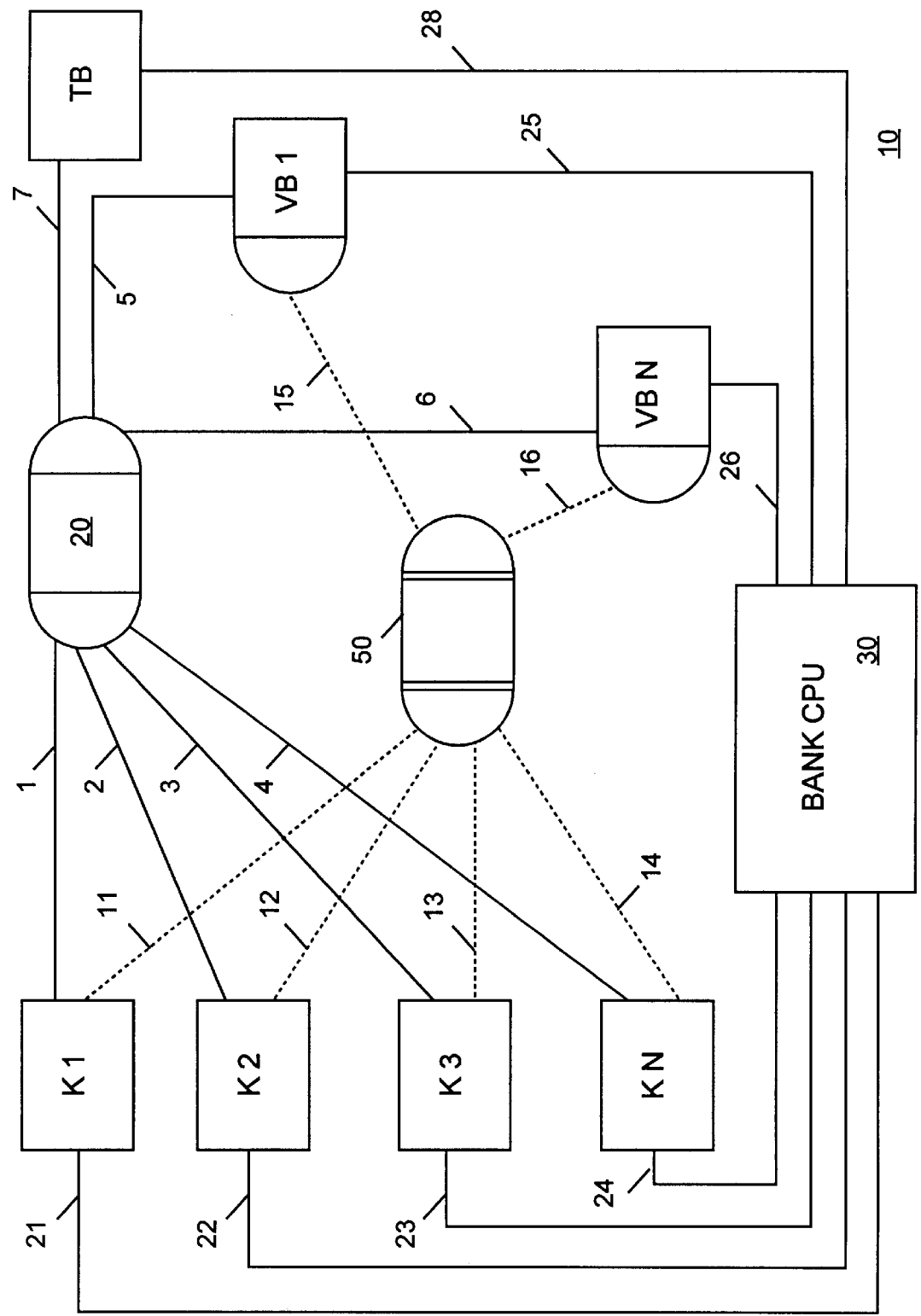
FIG. 1 is an overall schematic block diagram showing interconnections between kiosks, bankers and the bank's central information processor or CPU.
Figure 2:
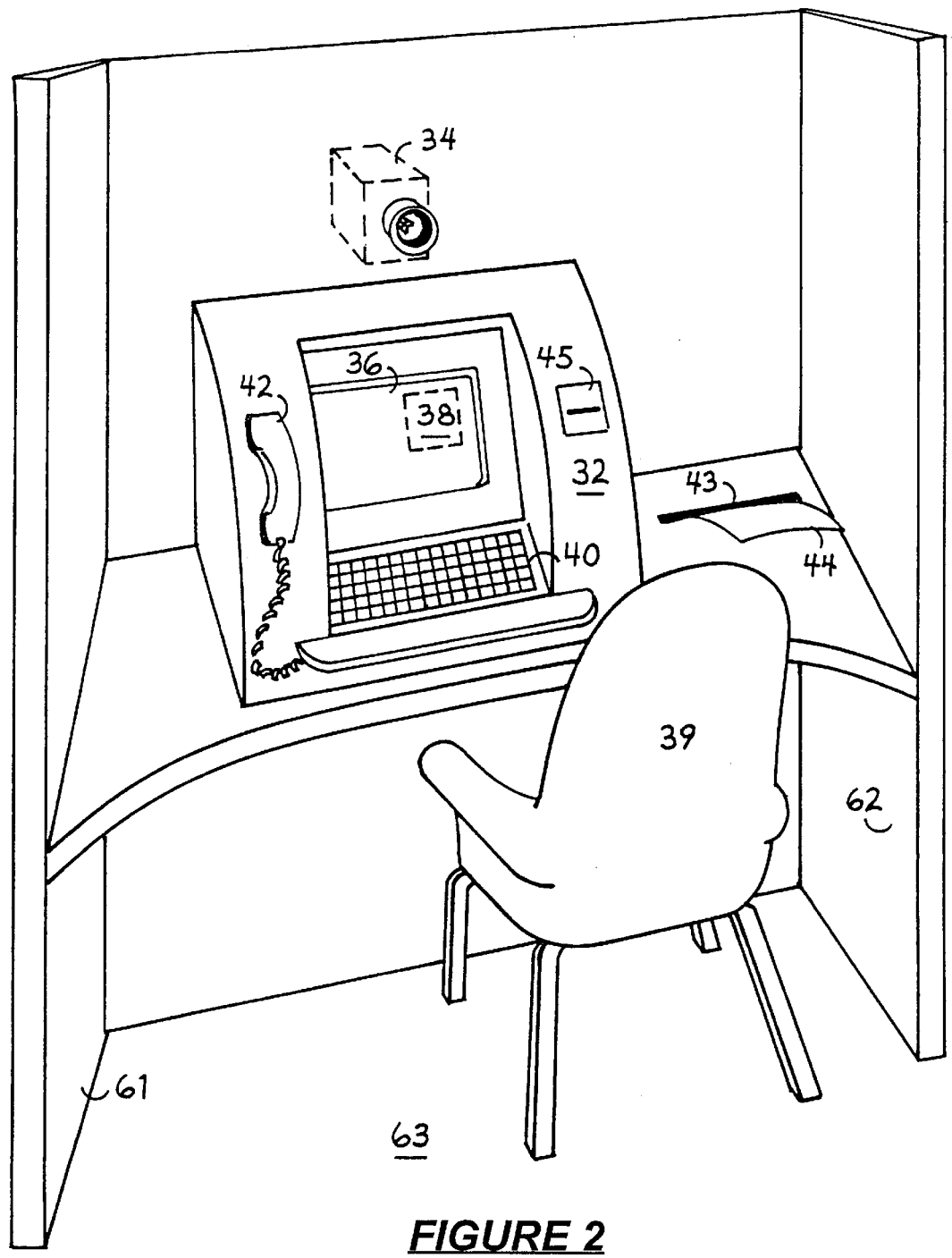
FIG. 2 is a perspective view of a customer kiosk or a banker station which may be used in the system of FIG. 1.

In accordance with the present invention as shown in the arrangement of FIG. 1, if the customer desires to be in communication with a banker, the customer touches an appropriate area or "button" on the screen on one of the kiosks $K_1$, $K_2$, $K_3$, . . . , $K_n$ or inputs his/her request into the computer with a keyboard 40 at the kiosk which is shown in FIG. 2. The customer "kiosk" as referred herein is an identifiable banking site bearing a bank brand that will typically include a self-service ATM interconnected to the bank central information processor or CPU 30 and will additionally have the management and conferencing capabilities described herein.

With further reference to FIG. 1, at the kiosk in response to a customer request for video connection to a banker, a call to the switch or call distributor 20 is made through a conventional voice telephone line, preferably equipped with asynchronous modems at each end. As used herein, "voice" telephone line is meant to include an analog type telephone line, as opposed to a high speed digital telephone line. The call distributor 20 routes the call to one of the terminals/computers of the banker's stations $VB_1$, . . . , $VB_m$. As used herein, the locations of the bankers $VB_1$, . . . , $VB_m$ include devices, such as transceivers, PCs or videophones, that can receive and transmit data, voice and video information. FIG. 1 is an overall schematic block diagram showing, in general fashion, the interrelationship of certain functional and operative components of the personal banker customer management system, generally designated 10. The personal banker customer management system 10 includes a plurality of customer kiosks $K_1$, $K_2$, $K_3$, . . . , $K_n$ in communication through conventional telephone voice line with a call distributor 20 that can manage and route the customer signal communications from the kiosks $K_1$, $K_2$, $K_3$, . . . , $K_n$ to the bankers' locations similarly equipped as shown in FIG. 2, thereby connecting a customer using one of the kiosks with one of the bankers via voice telephone lines 1, 2, 3, 4, 5 and 6. As used herein, "customer" includes a current bank customer or a person interested in obtaining information about the bank or the bank's products and services.

In the arrangement of FIG. 1, the kiosks and bankers are also connected by digital video capable communication lines 11, 12, 13, 14, 15 and 16 and interfaces, such as ISDN, T1, Sonnet fiber, ATM (asynchronous transmission mode) network lines and the like, that are capable of interactive transmission of real time video images. As referred to herein, the specific references are interchangeable and generally refer to a line capable of high speed digital video signal transmission. The dual communication links produce a dial-up video connection between the banker and a calling kiosk upon the initiation of a call from a kiosk over a voice telephone line routed through distributor 20 to an available banker. When the banker receives a voice line call from a kiosk routed through the distributor 20, the banker then initiates the video call to the kiosk over the video line.

At the banker's station, an asynchronous modem answers the call received over the voice line and the banker's computer sends a request for identification to the asynchronous modem at the customer kiosk. If the data communication between the modem at the kiosk and the modem at the banker's computer indicates a proper identification, the banker's computer then places a "video" call using an ISDN, T1 or high speed digital line through the video exchange 50 back to the computer at the kiosk from which the customer's request was sent. In a preferred embodiment, the call over the voice line remains connected until the "video" call is terminated by the banker, at which time the voice line is terminated. This allows the call distributor 20 to determine that the particular banker is busy; it then routes the call to another banker or maintains that call in queue. The management of the voice calls provides the ability to manage the video calls.

When the video call is connected, the banker has then established real time video interaction with the customer at the kiosk. The customer is then able to have a face-to-face conversation with the banker about any financial services, products and/or information that the customer desires, even though the customer is at a remote location from the banker.

Both the kiosks $K_1$, $K_2$, $K_3$, . . . , $K_n$ and the bankers' station $VB_1$, . . . , $VB_m$ are in communication with the bank's central information processor 30 through a network connection to the bank's mainframe systems. The links from the central information processor 30 to the bankers are shown at 25 and 26; and the bank's central information processor 30 is similarly connected to the kiosks $K_1$, $K_2$, $K_3$, . . . , $K_n$ via communications links 21, 22, 23 and 24. These mainframe links allow the customer to obtain basic information, such as account information and balances, statements and transaction information, enabling the customer to transfer money from one account to another, make loan payments, stop payments, and other similar transactions and likewise provide the banker with similar capability.

The personal banker customer management system 10 includes a number of video bankers' stations $VB_1$, . . . , $VB_m$ located at one or more central locations. This allows the bank to centralize bankers who are knowledgeable in the financial services and products being offered by the bank in one location (or more than one location in the interconnection of the system) rather than having to have the bankers placed at each of the branch locations of the bank where they may incur down time in waiting for customers. This results in a more efficient use of bankers. The plurality of customer kiosks $K_1$, $K_2$, $K_3$, . . . , $K_n$ may be located in various locations, including in bank branch offices, shopping malls, and other publicly accessible locations.

Figure 3A:
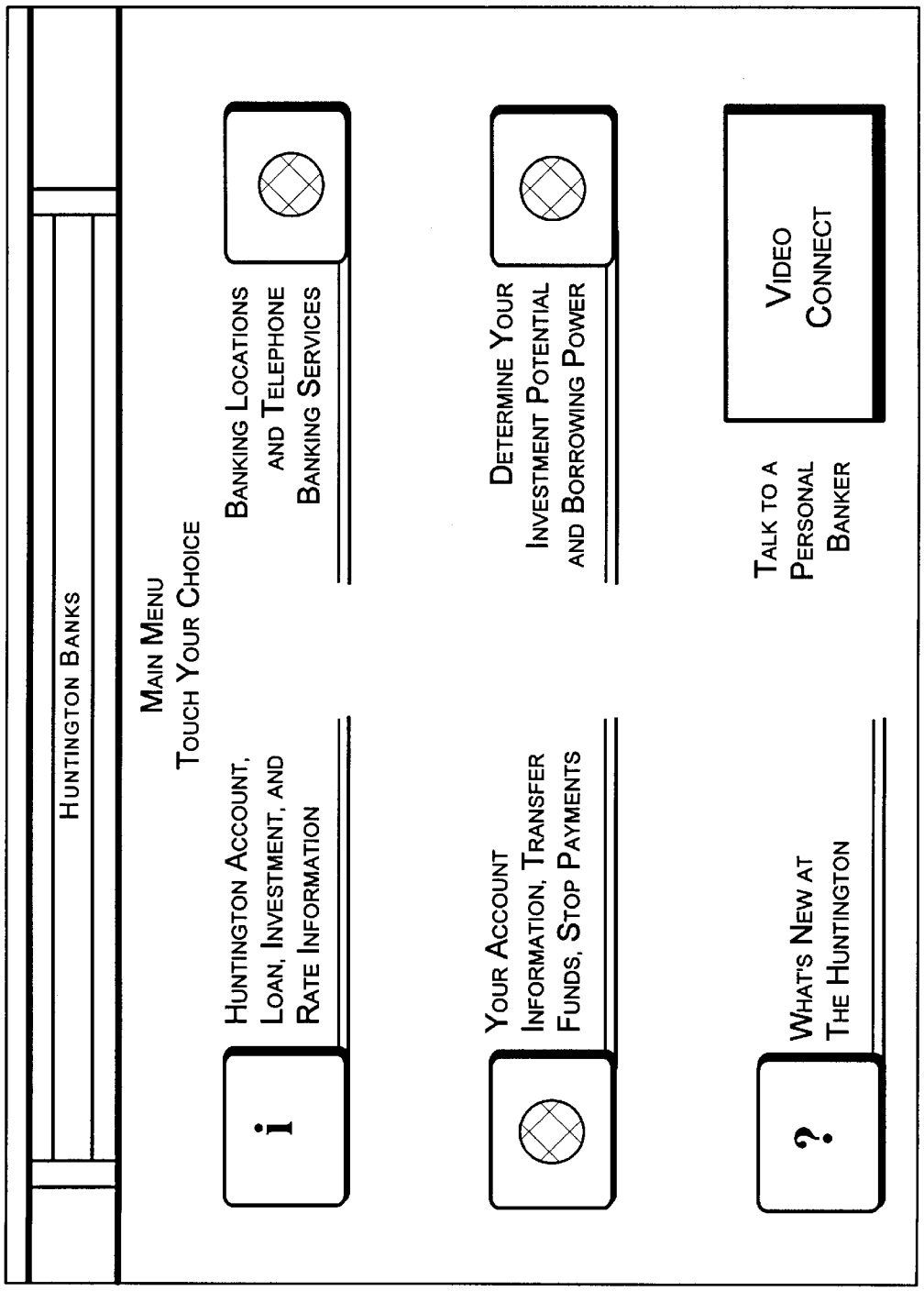
FIGS. 3A and 3B show typical screens displayed to a customer at a kiosk.
Figure 3B:
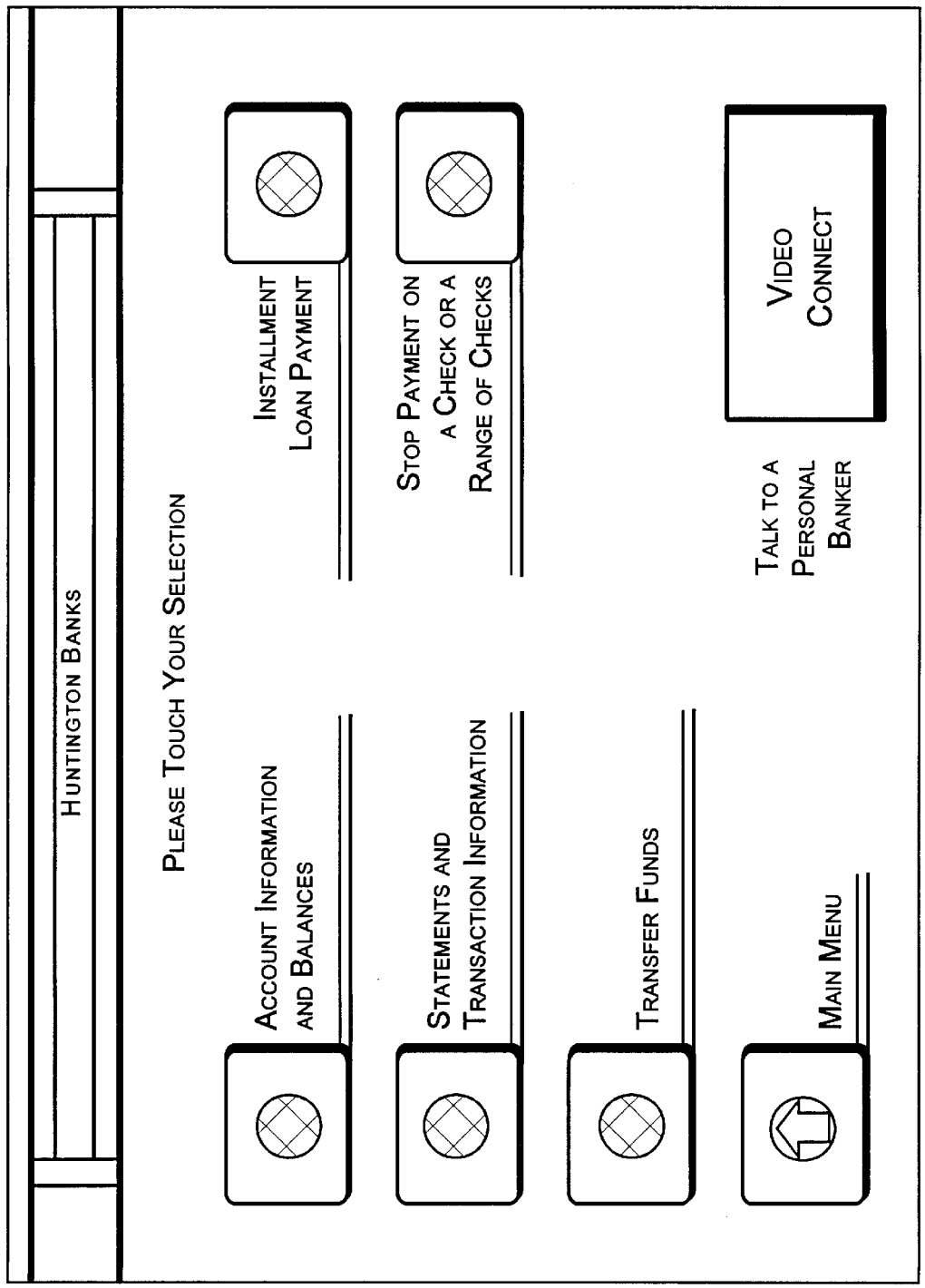

Referring now to FIG. 2, a perspective view of an example of a customer kiosk and/or banker station is shown. The kiosk 30 or banker station may include a housing 32 and a display screen 36 mounted in the housing 32 for viewing by a customer or banker. A camera 34 is provided to enable video transmission of the customer's and/or banker's image or other visual information. On a portion 38 of the display screen 36, the real-time video images can be shown. The kiosks and stations may also include a keyboard 40 which allows the customer or banker to enter information. The display screen 36 may be a touch screen so that the customer can input information by touching certain areas or "buttons" on the display screen 36. Examples of touch screen buttons are shown in FIGS. 3A and 3B. A printer is also provided at the customer kiosk. This printer may be hidden from the view of the customer with a slot 43 from which printed paper 44 is dispensed. A scanner (not shown) may also be connected to the central information processor 30 at the kiosk to enable a customer to provide information to the banker via the scanner, including documents, identification, and the like.

With further reference to FIG. 2, the customer kiosks $K_1$, $K_2$, $K_3$, . . . , $K_n$ and the banker stations contain a central information processor 30, such as a conventional PC, including programmable memory such as a disk drive, CD ROM and the like, and a modem. In a public kiosk, these items are preferably concealed within the housing 32 and are inaccessible to the customer. A telephone 42 may also be provided so that the customer and banker can talk to each other. A speaker phone is also suitably appropriate and the kiosk and/or work station can be adapted for varying degrees of privacy and/or locational dictates. As shown in FIG. 2, primary side walls 61 and 62 extend upwardly from the floor 63. The telephone 42 may also be used by the customer if all bankers with video capability or access are unavailable. The customer kiosk housing 32 includes a card reader 45 that can read a bank card, credit card, or other compatible card of the customer. This card reader 45 may be a magnetic strip reader that permits the reading of data stored in a magnetic strip on a bank card, credit card or other type of card. Alternatively, the reader may be a combination reader that accommodates "smart cards" that are plastic cards with microprocessors therein that replace the magnetic strip. (The card reader is not necessary to the banker station.) The customer kiosk and bank station may also include a chair 39. In this way, the traditional in-person face-to-face conference between the banker and the customer over a desk at a bank office is replicated. A security system employing mathematical algorithms to provide secure transmission of monetary values to customers may be included in the communications protocol in the system.

The physical configuration at the banker's location will be similar to the kiosk configuration. It is preferable that the banker has one computer to collaboratively interact with the customer at the corresponding customer kiosk, as well as be able to obtain information from the bank's central information processor 30 to get information about customer accounts, interest rates, and other financial services, products and information. Instead of one computer that performs all of these functions, the banker may have one computer that enables access to the bank's financial services, products and information, and another computer that is directly connected to the customer kiosk via the video communications link, although it is preferable to have one computer perform all of these functions. The video display screens of the kiosk may differ from the screens displayed at the banker station.

For a customer to use the system 10, the customer will typically go to a customer kiosk and view a main menu on the display screen 36. An example of the main menu is shown in FIG. 3A. After log-on, which may be by a magnetic strip card and PIN number for existing bank customers, or other signal for non-customers who desire information, the customer can then indicate on a touch screen which option he/she would like to choose. In the example shown in FIG. 3A, the choices are:

1) Huntington® Account, Loan, Investment, and Rate Information;
2) Your Account Information, Transfer Funds, Stop Payment;
3) Banking Locations and Telephone Banking Services;
4) Determine Your Investment Potential and Borrowing Power;
5) What's New at The Huntington®; and
6) Video Connect.

In this regard, the screen displays a branded identity, immediately conveying to the consumer the bank name that is the foundation of the customer's personal relationship.

When the customer chooses one of the options, the next screen contains information related to that option and/or more options. The flow of these screens such as the menu function screen shown in FIG. 3B depends on the financial service, product or information corresponding to the customer's choice. The types and varieties of menu screens maintained in the ROM memory in the PC at the kiosk will vary and can be changed periodically, consistent with product or seasonal promotions, service offerings and the like.

The kiosk screen displays may be controlled by a PC at the kiosk location. Account information may be accessed from the bank mainframe. The bank can choose to have advertisements and/or other information about the bank displayed on the screens for customer attraction purposes. At the kiosk, it is preferable that all of the screens have the option for the customer to choose to have a face-to-face video conversation with a banker. This allows the customer to obtain real-time video interaction with a banker from any screen within the flow of screens, so the customer's spontaneous responses to menu displays are not lost and so that a customer does not have to go back to an earlier screen in order to get video access to a banker.

It is also a feature of the invention that when the customer registers his/her request for a connection by video with a banker, the last screen that the customer was looking at on the display 36 will be shown to the banker when the video call is connected. This enables the banker to know which screen that the customer was interested in immediately before the customer made the choice to have video access to the banker. The customer may register his/her request for a connection by video with the banker by a variety of means, including the pressing of an area or "button" on a touch screen, pressing a key on a keyboard connected to the computer in the kiosk, by voice, and other means known in the art.

When the customer makes the choice for video access to a banker, the call distributor 20 receives a call over a conventional telephone voice line from the customer kiosk and distributes the call to an available video banker. The call distributor or rotor 20 for a standard telephone voice line is a known device. Upon receipt of a call, the distributor will direct the call to an available banker or place the received calls in queue if all available bankers are occupied. By reason of a caller identification system, the banker receiving a call from the call distributor 20 places a video call from the banker's location to the calling kiosk. This can be done manually, automatically, through a programmed modem connecting the system and switch or other means. The video connection is effected through the high speed digital line such as referred to above, or other enhanced quality line exchange for digital video transmission. Thus, the call distributor 20 routes the call from the kiosks to an available banker from among a plurality of bankers and if there are no available bankers to take the call at that time, the call distributor 20 puts the voice call in a queue until a banker is available to take that particular call. Hence, the system 10 provides a method for video connection that allows video calls to hold, queue, transfer and conference in the context of an overall call management system.

In the prior art, even if dedicated video lines between each kiosk and each banker were provided the only alternative available to a customer would be to receive a busy signal on the video line if a banker were occupied and the customer's video requests would not be queued and directed to the next available banker. Further, in such a system, no efficiency in the utilization of a banker or speed in the attention given to a customer is realized. A dedicated video line would cause a customer to receive a busy signal instead of being in queue for attention by the next available banker. The present invention also provides for overload and disaster recovery. In the system of the invention, once the banker is available, the voice call is connected to the banker and a video call is made by the banker to the corresponding customer kiosk so that a live two-way video conference between the customer and the banker can take place. If a predetermined period of time passes before a banker is available to take the video call, the call will be directed over voice communications link 7 to another banker TB who does not have video access but who can talk to the customer and see if the customer's needs can be handled by voice telephony. This banker TB is typically one of a plurality of bankers with voice access. This banker TB is connected to the central information processor 30 via communications link 28.

Once the video call is enabled, an interactive video of the banker is shown on a portion, or possibly all, of the display screen 36 at the customer kiosk. FIG. 3C shows a display screen 36 at the customer kiosk with a video of a banker shown on a portion of the display screen 36. Also, a video of the customer is shown on a portion, or all, of the display screen of the banker's terminal. It is preferable that the respective videos of the banker and of the customer are shown on the periphery or in a corner of the respective display screen and that it does not take up more than about ¼ of the area of the display screen.

This two-way video interaction between the customer and the banker is essentially in real time. While current video image capability is about 15–30 frames per second, the frames per second will increase over time due to technical advances and the video image will be clearer. This video call also contains audio so that the banker and customer can talk to each other about various financial services, products and information.

Once introductions of the banker and the customer are made over the video connection, the banker can cause information to appear on the display screen 36 of the customer kiosk. This information may include a variety of financial services, products, and information available to the customer, and may even be an image of a loan application or other document that is specific to a transaction that the customer would like to pursue.

EXAMPLE 1

In FIG. 1, four kiosks, two video banker stations and a conventional telephone banker TB are interconnected in a system. Each of the kiosks and the bankers are connected to the bank mainframe CPU 30.

When, for example, a first kiosk $K_1$ registers a request for video connection over the voice telephone line 1, the request will be directly routed to a first available banker $VB_1$ who will initiate a video call over the ISDN line 15 and 11 to the kiosk $K_1$. The ISDN lines are interconnected or routed by ISDN exchange 50. During this video call, the signal over the voice line 1 remains open and the call distributor 20 recognizes that the first banker $VB_1$ is busy.

When a second kiosk $K_2$ registers a call over the voice line 2 for video connection, the call distributor 20 recognizes that the first banker $VB_1$ is busy and will route the call to the second banker $VB_m$ who initiates the video call over the ISDN line 16 and 12 to the calling kiosk $K_2$.

If both bankers are busy when a third kiosk $K_3$ requests a video connection, that call over the voice line 3 is reserved by the distributor 20 and is subject to alternative hold until either one of the two bankers $VB_1$ and $VB_m$ becomes available; or after the passage of a predetermined period of time, the call distributor 20 routes the call to a conventional telephone banker TB. In the unlikely event that all bankers are busy at the same time, the call distributor 20 will put the calling kiosk K₃ on hold in queue for attention by the next available banker.

EXAMPLE 2

In the system 10, conventional hardware provided by AT&T operates in a configured system as follows:

The customer touches the Video Call logo on the touch screen of a modified Model 5682 AT&T remote banking terminal that in large measure comprises a conventional PC capable of accessing the bank's mainframe. The 5682 then places a "voice" call to the automated call distributor (ACD), using an Asynchronous Modem. The ACD will route the call to a call center PC for handling and management. At the PC, the Asynchronous Modem will answer the call and send a request for identification to the originating 5682, which will respond with a unique test value it reads from a file at the start of the day. The value will be sent with a trailing sum check. Upon receiving the text value, the VT answer application will calculate a sum check and compare the two. If the sum checks match, an "OK" will be sent back. If they do not match, a "FAIL" will be sent back, and the VT call application will attempt to transmit 2 more times. After failing to connect 3 times it will log an error, and execute the "time-out logic." This provides a level of security. When the sum checks match, the VT answer application will use the text value received to look up the video numbers in a text file. Having found the numbers, the VT answer application will place a "video" call back to the 5682 over an ISDN line. The "voice" call will remain connected until the "video" call is terminated by the banker at which time the software in the call center PC will terminate the "voice" call.

The agent will terminate the video call by clicking on a button under the video image. The agent will also be able to control the local audio volume, and to mute the local microphone, by clicking on buttons under the video window. Call hang-up and termination of video connection with an "Are you sure?" message box will also be accomplished by a button in the same row under the video window.

The ACD will be set to continuous ringing while the call is in queue. The VT call application will wait for a length of time before terminating the call. The length of time to wait will be read from a text file at the start of the day. Once the length of time to wait has been passed, (this is a time-out), the VT call application will cause a voice call to be placed over the ISDN lines. The number called will be read from a file at start of day. This voice call will be audible by the customer and can be processed as the ISDN call is today. With all connection failures, the "time-out logic" will be executed. The agent is responsible for all CMS messaging to the ACD.

The present invention also enables "collaborative document processing" which means that both the banker and the customer can modify a document on their respective display screens from their respective locations. For example, on a loan application, it may be quicker for the customer to fill in his name, social security number, address, telephone number and other personal information rather than telling the banker what that information is and having the banker type this information into the system. For particular rates and any other categories of information, it may be more prudent to have the banker type that information into the loan application. The loan application would appear as the changes are being made on the video display screens at both the customer kiosk and the banker's computer. Alternatively, the customer could tell the banker all of the information that is needed and have the banker input all of the information from the banker's computer.

The system also enables documents to be printed at the customer kiosk for the customer to take. The customer may choose to take the document with him/her for later execution and mail the document to the bank (such as a loan application or signature card). If payment needs to be made, the customer can choose to have the amount of the payment taken out of one of their accounts with the bank or have it charged to a credit card.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

What is claimed is:

1. A method for managing real time interaction between a bank customer at one of a plurality of kiosk locations and access from the kiosk to bank information files and one among a plurality of personal bankers stationed at a location remote from the kiosk in which the customer, at the customer's discretion, may optionally request video access to a banker for a conversation, comprising:

providing a plurality of customer kiosks, each at a location remote from the bankers, and each kiosk having a video camera, a video screen, means for communicating with a bank central information processor regarding customer's accounts and bank products and information, and means by which a customer can input choices regarding customer accounts and bank products and services and discretionarily register a request for video conversation to a banker;

connecting the means in the customer kiosk to a bank central information processor that contains information and data files regarding customer accounts and bank products and information, the connection allowing data communication between the kiosk and the central information processor in response to customer input at the kiosk;

providing a plurality of banker stations, each having a video camera, a video screen, means for receiving customer input transmitted from a kiosk, means for accessing information regarding customer's accounts and bank products and information, and means by which a banker at the station can initiate a video connection for conversation with a customer at a kiosk;

connecting the banker stations to the bank central information processor that contains information and data files regarding customer accounts and bank products and information, the connection allowing data communication between the banker station and the central information processor;

connecting each of the kiosks and the banker stations to a central exchange that is capable of providing an interconnection between any one of the kiosks sending a request for video conversation and any one of the banker stations in response to a request received from a kiosk, the exchange monitoring each of the banker stations with regard to whether the station is connected with a kiosk and whether the banker at the station is available, the exchange, upon receipt of the conversation request from the kiosk, transmitting a signal from the kiosk to a signal distributor, the signal distributor processing the requests received, dependent upon the availability of a banker from among the plurality, according to a sequence of (a) direct connection to an available banker and (b) hold, (c) queue and (d) transfer to a next available banker, and identifying by a signal to the banker determined in the sequence process, the kiosk from which the request for video conversation with a banker was initiated; and connecting the banker upon the banker's receipt of the signal processed by the signal distributor, with the customer at the requesting kiosk through the video cameras and video screens at each location through an interconnection effected between the two at the central exchange whereby the banker initiates direct interactive video conversation with the customer at the kiosk requesting the conversation.

2. The method of claim 1 including a separate voice-only telephone line and a separate video line interconnecting the kiosks and the central exchange in which the customer's request for a video connection to a banker is sent over a voice only telephone line.

3. The method of claim 1 in which the processing by the signal distributor after hold, queue and transfer to a next available banker additionally includes maintaining a back-up option comprising connecting the customer with a voice only banker if a video banker is not available within a predetermined period of time.

4. The method of claim 1 including a separate voice-only telephone line and a separate video line interconnecting the kiosks and the central exchange whereby the banker's initiation of the direct interactive video communication with the customer at the requesting kiosk is sent over the video line.

5. The method of claim 1 wherein the customer can search for information regarding the customer's account and bank services, products and information through a flow of screens displayed on the video screen of the customer kiosk.

6. The method of claim 5 whereby when the customer registers a request for a video connection to a banker, the image of information on the video screen of the customer kiosk at the time the request is sent is transmitted to and displayed on the video screen of the banker's station when the video conversation between the banker and the customer at the kiosk is effected.

7. The method of claim 5 including displaying in each screen within the flow of screens a means for enabling the customer to register a request for video conversation with a banker.

8. The method of claim 1 further comprising the step of enabling the banker to display documents on the video screens of the customer kiosk and the banker's terminal simultaneously.

9. The method of claim 8 wherein information in the documents displayed on the video screens can be added, deleted or modified by the customer at the kiosk and by the banker at the banker's station, and the information added, deleted or modified is shown on the respective kiosk and banker video screens simultaneously.

10. The method of claim 8 further comprising the step of printing at least one of the group consisting of a document displayed on the video screens and the information about the bank's services and products that are displayed on the video screens.

11. The method of claim 1 wherein the video screen of the customer kiosk displays a video of the banker on a portion of the video screen and displays information and data regarding the customer's account and bank services, products and information on another portion of the video screen during the real time video conversation between the customer and the banker.

12. The method of claim 1 wherein the video screen of the banker's station and the video screen of the kiosk respectively display a video of the customer and the banker on a portion or all of the video screen during the real time video conversation between the customer and the banker.

13. A system for managing real time interactive access by a bank customer at one of a plurality of kiosk locations to (a) information about customer accounts and bank products and services, and (b) two way video contact with one among a plurality of personal bankers stationed at a location remote from the kiosk in which, at the customer's discretion at the kiosk, a video conversation with a banker may be requested, comprising:

a plurality of customer kiosks, each at a location remote from the bankers, and each having a video camera, a video screen, means for receiving customer input regarding customer's accounts and bank products and information, and means by which a customer can input choices regarding customer accounts and bank products and services and optionally register a request for a video conversation with a banker;

means for connecting the customer kiosk to a bank central information processor that contains information and data files regarding customer accounts and bank products and services and for transmitting the customer's input to the processor, the connection allowing data communication between the kiosk and the central information processor in response to customer input at the kiosk;

a plurality of banker stations, each having a video camera, a video screen, means for receiving customer input transmitted from a kiosk and means by which a banker at the station can initiate a video connection to a customer at a kiosk;

means for connecting the banker stations to the bank central information processor that contains information and data files regarding customer accounts and bank products and services, the connection allowing data communication between the banker station and the central information processor;

means for connecting each of the kiosks and each of the banker stations to a central exchange that is capable of selectively providing an interconnection between any one of the kiosks and any one of the banker stations;

means for allowing a customer at a kiosk to register a request for a video conversation with a banker, said means transmitting a signal to a signal distributor, the signal distributor including means for monitoring each of the banker stations with regard to whether the station is available for connection to a kiosk and further means for processing the requests received, dependent upon the availability of a banker from among the plurality, according to a sequence of direct connection to an available banker and hold, queue and transfer to a next available banker, and further means for identifying by a signal to the banker determined in the process of the distributor, the kiosk from which the customer's request for video conversation was initiated; and means for allowing a banker, upon a banker's receipt of a signal processed by the signal distributor, to initiate direct interactive video communication with the customer at the requesting kiosk through the video cameras and video screens at each location through an interconnection effected between the two at the central exchange.

14. The system of claim 13 wherein the video screen of the banker's station and the video screen of the customer kiosk respectively display a video of the customer and the banker on a portion or all of the video screen during the real time video conference between the customer and the banker.

15. The system of claim 13 wherein the video screen of the customer kiosk and the video screen of the banker's station respectively display a video of the customer and the banker on a portion of the video screen and display information and data regarding the customer's account and bank products and services on another portion of the video screens during the real time video conference between the customer and the banker.

* * * * *